United States Patent
Simonsen

(10) Patent No.: US 12,227,925 B2
(45) Date of Patent: Feb. 18, 2025

(54) METHOD FOR REMOTE ESTIMATION OF THE HYDRANT WATER PRESSURE AT A HYDRANT AND A HYDRANT WATER PRESSURE ESTIMATION SYSTEM

(71) Applicant: AVK Holding A/S, Galten (DK)

(72) Inventor: Christian Henrik Simonsen, Ulstrup (DK)

(73) Assignee: AVK HOLDING A/S, Galten (DK)

( * ) Notice: Subject to any disclaimer, the term of this patent is extended or adjusted under 35 U.S.C. 154(b) by 371 days.

(21) Appl. No.: 17/798,614

(22) PCT Filed: Feb. 3, 2021

(86) PCT No.: PCT/DK2021/050034
§ 371 (c)(1),
(2) Date: Aug. 10, 2022

(87) PCT Pub. No.: WO2021/170188
PCT Pub. Date: Sep. 2, 2021

(65) Prior Publication Data
US 2023/0140627 A1 May 4, 2023

(30) Foreign Application Priority Data
Feb. 24, 2020 (DK) .......................... PA 2020 70120

(51) Int. Cl.
*G01L 19/08* (2006.01)
*E03B 7/07* (2006.01)
(Continued)

(52) U.S. Cl.
CPC ............ *E03B 7/07* (2013.01); *F16K 37/0083* (2013.01); *G01L 19/086* (2013.01); *E03B 9/04* (2013.01)

(58) Field of Classification Search
CPC .......... E03B 7/07; E03B 9/04; F16K 37/0083; G01L 19/086
See application file for complete search history.

(56) References Cited

U.S. PATENT DOCUMENTS

| | | | |
|---|---|---|---|
| 10,451,193 B2 | 10/2019 | Freudendahl | |
| 2008/0281534 A1* | 11/2008 | Hurley | G01F 1/46 702/47 |
| 2017/0216645 A1* | 8/2017 | Silvers | H04W 4/38 |

FOREIGN PATENT DOCUMENTS

| | | |
|---|---|---|
| CN | 105625514 A | 6/2016 |
| CN | 205604348 U | 9/2016 |

(Continued)

OTHER PUBLICATIONS

International Search Report for corresponding application PCT/DK2021/050034 filed Feb. 3, 2021; Mail date Apr. 23, 2021.
(Continued)

*Primary Examiner* — Jennifer Bahls
(74) *Attorney, Agent, or Firm* — CANTOR COLBURN LLP

(57) ABSTRACT

A method and system for remote estimation of hydrant water pressure at a hydrant located at an end of a branch pipe being branched of a main pipe, the method including detecting a valve open-close status of a stop valve arranged in the branch pipe and transmitting the valve open-close status wirelessly to an external data system, detecting a hydrant open-close status of the hydrant and transmitting the hydrant open-close status wirelessly to an external data system, detecting a branch water pressure of water in the branch pipe and transmitting the branch water pressure wirelessly to the external data system, and estimating the hydrant water pressure at the hydrant based on the valve open-close status, the hydrant open-close status and the branch water pressure.

32 Claims, 3 Drawing Sheets

Figure 1:
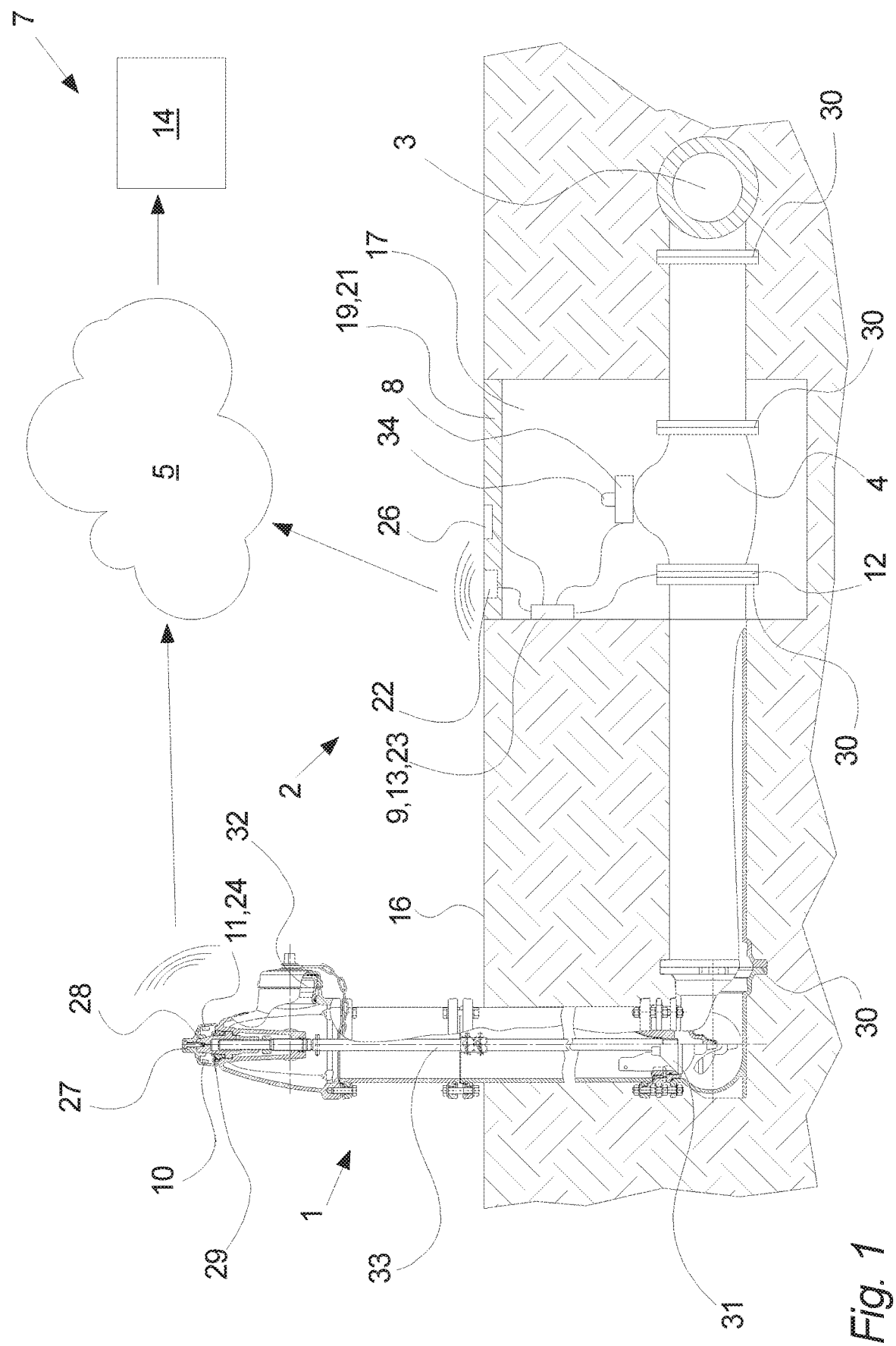

(51) Int. Cl.
*F16K 37/00* (2006.01)
*E03B 9/04* (2006.01)

(56) References Cited

FOREIGN PATENT DOCUMENTS

| | | |
|---|---|---|
| CN | 206138624 U | 5/2017 |
| CN | 109091786 A | 12/2018 |
| CN | 208381474 U | 1/2019 |
| CN | 111135519 A | 5/2020 |
| FR | 3071166 A1 | 3/2022 |
| WO | 2014189901 A1 | 11/2014 |
| WO | 2017053396 A1 | 3/2017 |

OTHER PUBLICATIONS

Written Opinion for corresponding application PCT/DK2021/050034 filed Feb. 3, 2021: Mail date Apr. 23, 2021.

* cited by examiner

METHOD FOR REMOTE ESTIMATION OF THE HYDRANT WATER PRESSURE AT A HYDRANT AND A HYDRANT WATER PRESSURE ESTIMATION SYSTEM

TECHNICAL FIELD

The disclosure relates to a method for remote estimation of the hydrant water pressure at a hydrant located at the end of a branch pipe being branched of a main pipe. The disclosure also relates to a hydrant water pressure estimation system for remote estimation of the hydrant water pressure at a hydrant located at the end of a branch pipe being branched of a main pipe.

BACKGROUND

Fire hydrants are generally not used very often, but when they are it is highly important that the water pressure in the hydrant is sufficient to provide enough water flow to extinguish the fire. However, many hydrants are placed at the end of a branch and over time leaks, collapsing pipes, deterioration and other can significantly reduce the water pressure at the hydrant.

Thus, from the International Patent Application WO 2017/053396 A1 it is known to remotely monitor the water pressure at a hydrant by means of a pressure sensor on the water exposed surface of the underground valve and then transmit the sensor data up to an wireless transmitter arranged at the top of the hydrant and from there transmitting the sensor data to a wireless communication network. However, such a system is difficult and expensive to install.

The disclosure therefore provides for an advantageous technique for remote estimation of the water pressure at a hydrant.

BRIEF SUMMARY

The disclosure provides for a method for remote estimation of the hydrant water pressure at a hydrant located at the end of a branch pipe being branched of a main pipe. The method comprises the steps of
  detecting a valve open-close status of a stop valve arranged in the branch pipe and transmitting the valve open-close status wirelessly to an external data system,
  detecting a hydrant open-close status of the hydrant and transmitting the hydrant open-close status wirelessly to the external data system,
  detecting a branch water pressure of water in the branch pipe and transmitting the branch water pressure wirelessly to the external data system, and
  estimating the hydrant water pressure at the hydrant based on the valve open-close status, the hydrant open-close status and the branch water pressure.

It is relatively simple to arrange a branch pressure sensor somewhere in the branch pipe (at least compared to installing it the underground valve of the hydrant). And in principle the water pressure in the branch pipe will be the same as at the hydrant valve. However, detecting the water pressure in the branch pipe could lead to a faulty estimation of the pressure at the hydrant e.g. if the stop valve located in front of the hydrant in the branch pipe was closed or of the hydrant was open. Fire hydrants are sometimes used for other purposes than for extinguishing fires, such as for emergency or temporary domestic water supply, for filling a local swimming pool and they are regularly opened to flush the branch pipe to avoid bacteria growth or other in the branch pipe. And the gate valve could be left in a closed state after maintenance or repair or it could be tampered with. Thus, to ensure that the estimate of the hydrant water pressure is more correct it is advantageous to base the estimate on the valve open-close status, the hydrant open-close status and the branch water pressure to avoid the a fire department would choose use a hydrant further away from a fire only because the hydrant was already open or the stop valve was closet at the nearest hydrant leading to an incorrect hydrant pressure estimate.

It should be noted that in this context the term "detecting a . . . open-close status" is not necessarily limited to that it is detected if the valve or hydrant is fully open or fully closed. The term could also include that it is detected how much the valve or the hydrant is opened or closed.

In an aspect of the disclosure, the branch water pressure is detected between the stop valve and the hydrant.

Measuring the branch water pressure between the stop valve and the hydrant is advantageous in that this part of the branch pipe is closest to the hydrant leading to a more correct hydrant pressure estimate.

In an aspect of the disclosure, the branch water pressure is detected between the stop valve and the main pipe.

Measuring the branch water pressure between the stop valve and the main pipe is advantageous in that a relatively correct hydrant pressure estimate can be made at this location even if the stop valve is closed.

In an aspect of the disclosure, the hydrant open-close status is transmitted wirelessly from the hydrant to the external data system via the same wireless communication means transmitting the valve open-close status and/or the branch water pressure to the external data system.

Communicating wireless signals long range is power consuming and the wireless communication means are relatively expensive and space consuming. Thus, it is therefore advantageous to transmit the hydrant open-close status, the valve open-close status and/or the branch water pressure to the external data system via the same wireless communication means.

It should be noted that in this context the term "wireless communication means" includes any kind of wireless communicator capable of communicating the operational parameter wirelessly to an external data system. I.e. the term comprises any kind data transmitter, signal sender, signal communicator or other.

In an aspect of the disclosure, the valve open-close status is transmitted wirelessly to the external data system if the valve open-close status changes, the hydrant open-close status is transmitted wirelessly to the external data system if the hydrant open-close status changes and/or the branch water pressure is transmitted wirelessly to the external data system if the branch water pressure changes.

Communicating wireless signals long range is power consuming and it is therefore advantageous to transmit the statuses and/or the pressure if these changes. This also enables that the hydrant water pressure estimation system can be used for detecting faults and tampering, which is advantageous in relation to generating a more correct estimate of the hydrant water pressure.

In an aspect of the disclosure, the valve open-close status is transmitted wirelessly to the external data system if the valve open-close status is outside a predefined range, the hydrant open-close status is transmitted wirelessly to the external data system if the hydrant open-close status is outside a predefined range and/or the branch water pressure is transmitted wirelessly to the external data system if the branch water pressure is outside a predefined range.

Communicating wireless signals long range is power consuming and it is therefore advantageous to transmit the statuses and/or the pressure if these are outside predefined ranges. This also enables that the hydrant water pressure estimation system can be used for detecting faults and tampering, which is advantageous in relation to generating a more correct estimate of the hydrant water pressure.

In an aspect of the disclosure, the valve open-close status is detected and communicated to the external data system in response to a request send from the external data system to wireless communication means arranged to communicate the valve open-close status wirelessly to the external data system.

Using the wireless communication means to both sending and receiving signals and/or data to and from the external data system is advantageous in that this will make the method more efficient and reduce cost.

In an aspect of the disclosure, the branch water pressure is detected and communicated to the external data system in response to a request send from the external data system to wireless communication means arranged to communicate the branch water pressure wirelessly to the external data system.

Using the wireless communication means to both sending and receiving signals and/or data to and from the external data system is advantageous in that this will make the method more efficient and reduce cost.

In an aspect of the disclosure, the hydrant open-close status is detected and communicated to the external data system in response to a request send from the external data system to wireless communication means arranged to communicate the hydrant open-close status wirelessly to the external data system.

Using the wireless communication means to both sending and receiving signals and/or data to and from the external data system is advantageous in that this will make the method more efficient and reduce cost.

In an aspect of the disclosure, the hydrant water pressure at the hydrant is estimated based on the valve open-close status, the hydrant open-close status and the branch water pressure at the external data system.

Estimating the hydrant water pressure at the external data system is advantageous in that the external data system has access to the valve open-close status, the hydrant open-close status and the branch water pressure and in that it is easier and less costly to provide the sufficient processing means to do a more correct estimate at the remote location.

In an aspect of the disclosure, the stop valve is arranged upstream in relation to the hydrant.

A purpose of the stop valve is to close water flow to the hydrant if this needs repair or maintenance and it is therefore advantageous to arrange the stop valve upstream in relation to the hydrant In an aspect of the disclosure, the method is performed by means of a hydrant water pressure estimation system according to any of the hydrant water pressure estimation systems discussed in the following.

Hereby is achieved an advantageous embodiment of the disclosure.

The disclosure also relates to a hydrant water pressure estimation system for remote estimation of the hydrant water pressure at a hydrant located at the end of a branch pipe being branched of a main pipe. The system comprises a stop valve open-close sensor arranged to detect a valve open-close status of a stop valve arranged in the branch pipe and wireless valve open-close status communication means arranged to communicate the valve open-close status wirelessly to an external data system. The system also comprises a hydrant open-close sensor arranged to detect a hydrant open-close status of the hydrant and wireless hydrant open-close status communication means arranged to communicate the hydrant open-close status wirelessly to the external data system. Further, the system comprises a branch water pressure sensor arranged to detect the water pressure in the branch pipe and wireless branch water pressure communication means arranged to communicate the branch water pressure wirelessly to the external data system. The system also comprises data processing means arranged to receive the valve open-close status, the hydrant open-close status and the branch water pressure by means of the external data system and wherein the data processing means is arranged to estimate the hydrant water pressure at the hydrant based on the hydrant open-close status, the valve open-close status and the valve water pressure.

Providing the hydrant water pressure estimation system with a stop valve open-close sensor, a hydrant open-close sensor and a branch water pressure sensor is advantageous in that it hereby is possible to estimate a more correct hydrant water pressure at the hydrant. And providing the system with wireless communication means capable of transmitting the detected statuses and the pressure to an external data system in that it is more efficient and less expensive to provide the external data system with the necessary data processing means to do the estimate. Furthermore, the wireless communication means enables that the current estimated water pressure at a large number of hydrants can be remotely monitored enabling that e.g. a fire department quickly can find the best hydrant in relation to a specific fire.

It should be noted that in this context the terms "wireless valve open-close status communication means", "wireless hydrant open-close status communication means" and "wireless branch water pressure communication means" refers to any kind of wireless valve open-close status communicator, wireless hydrant open-close status communicator and wireless branch water pressure communicator respectively capable of communicating the operational parameter wirelessly to an external data system. I.e. the term comprises any kind data transmitter, signal sender, signal communicator or other.

It should also be noted that in this context the term "data processing means" includes any kind of data processor capable of estimate the hydrant water pressure at the hydrant based on the hydrant open-close status, the valve open-close status and the valve water pressure. I.e. the term includes any kind of microprocessor, logical circuit, programmable or hardwired logic controller, computer or other or any combination thereof.

In an aspect of the disclosure, the branch water pressure sensor is arranged between a gate of the stop valve and the hydrant.

Placing the branch water pressure sensor between the gate of the stop valve and the hydrant is advantageous in that this part of the branch pipe is closest to the hydrant leading to a more correct hydrant pressure estimate.

In an aspect of the disclosure, the branch water pressure sensor is arranged between a gate of the stop valve and the main pipe.

Measuring the branch water pressure between the gate of the stop valve and the main pipe is advantageous in that a relatively correct hydrant pressure estimate can be made at this location even if the stop valve is closed.

In an aspect of the disclosure, the wireless valve open-close communication means and the wireless branch water pressure communication means are arranged as the same communication means.

Communicating wireless signals long range is power consuming and the wireless communication means are relatively expensive and space consuming. Thus, it is therefore advantageous to transmit the hydrant open-close status, the valve open-close status and/or the branch water pressure to the external data system via the same wireless communication means.

In an aspect of the disclosure, the wireless valve open-close communication means, wireless hydrant open-close status communication means and the wireless branch water pressure communication means are arranged as the same communication means.

Communicating wireless signals long range is power consuming and the wireless communication means are relatively expensive and space consuming. Thus, it is therefore advantageous to transmit the hydrant open-close status, the valve open-close status and/or the branch water pressure to the external data system via the same wireless communication means.

In an aspect of the disclosure, the branch pipe is buried in the ground below ground surface.

Arranging the branch pipe below ground surface is advantageous in that the branch pipe is hereby protected against collisions, tampering and other.

In an aspect of the disclosure, the stop valve is buried in the ground below ground surface and wherein the stop valve is arranged to be operated in a surface box comprising an upper opening at the ground surface.

Arranging the stop valve below a surface box with an upper opening at the ground surface through which the stop valve can be operated is advantageous in that this simplifies operation of the stop valve. Furthermore, the surface box provides for a suited location for wireless communication means, power units and other equipment of the system.

In an aspect of the disclosure, an extension device is connected to an operating device of the stop valve and wherein the extension device extends up into the surface box.

Providing the underground stop valve with an extension device extending up into the surface box is advantageous in that this will simplify operation of the gate valve.

In an aspect of the disclosure, the stop valve is at least partly arranged in the surface box.

Forming the surface box with a size enabling that it includes the stop valve is advantageous in that this will enable easy access to a branch water pressure sensor located at or in the stop valve.

In an aspect of the disclosure, the wireless valve open-close status communication means is arranged in the surface box.

The wireless valve open-close status communication means are sensitive and expensive, and it is therefore advantageous to locate it in the more protected environment of the surface box.

In an aspect of the disclosure, the upper opening is provided with a lid.

Providing the surface box with a lid is advantageous in that it enables easy access to the content of the surface box while at the same time protecting the content of the surface box.

In an aspect of the disclosure, the lid is made of plastic.

Plastic is an inexpensive material that is easy to form in the desired shape. And since plastic will allow signals to be transmitted substantially unrestricted through the lid it is advantageous to form the skirt part from plastic.

In an aspect of the disclosure, at least an antenna of the wireless valve open-close status communication means is arranged in, at or on the lid.

Most of the surface box is buried under the ground surface but to be able to access the inside of the surface box, the upper opening—provided with the lid—is freely accessible at the ground surface. It is therefore advantageous to place at least the antenna of the wireless valve open-close status communication means in, at or on the lid of the surface box to increase the communication range of the wireless valve open-close status communication means. Furthermore, by placing the wireless valve open-close status communication means in the lid, the wireless valve open-close status communication means may more easily be retrofitted in existing surface boxes simply by replacing the lid.

In an aspect of the disclosure, the hydrant water pressure estimation system further comprises a valve power unit for supplying electrical power to the stop valve open-close sensor and the wireless valve open-close status communication means, a hydrant power unit for supplying electrical power to the hydrant open-close sensor and the wireless hydrant open-close status communication means and/or a branch power unit for supplying electrical power to the branch water pressure sensor and the wireless branch water pressure communication means.

The branch pipe, hydrant and stop valve are often buried at remote locations where it would be difficult or expensive to provide a power connection to an external power source—such as the grid—and it is therefore advantageous to provide the power consuming parts of the system with their own power units. Furthermore, an integrated unit enables a simpler installation of the power units and the other parts of the system.

It should be noted that in this context the term "power unit" includes any kind of power generator capable of generating and/or supplying electrical power. I.e. the term comprises any kind of battery, fuel cell, solar cell, generator driven by an internal combustion engine or other or any combination thereof.

In an aspect of the disclosure, the valve power unit and the branch power unit are formed as a single power unit.

A single power unit enables a simpler installation, less maintenance and reduced costs.

In an aspect of the disclosure, the valve power unit and/or the branch power unit is arranged in the surface box or on, at or in the lid.

It is advantageous to place the valve power unit and/or the branch power unit in the surface box or in, at or on the lid of the surface box in that this location provides easy access while at the same time protecting the power units.

In an aspect of the disclosure, the valve power unit, the hydrant power unit and/or the branch power unit comprises one or more solar power cells.

Providing the power units with a solar power cell is advantageous in that wireless communication with an external data system consumes relatively much power and if the power units are not provided with some sort of power generating device the power units will have to be able to store a large amount of electrical power.

In an aspect of the disclosure, the stop valve is a gate valve.

Gate valves are a simple and well-proven valve type that is particularly suited as a stop valve in a branch pipe.

In an aspect of the disclosure, the hydrant open-close sensor and the wireless hydrant open-close communication means is arranged in or on an adapter cap, wherein the adapter cap is connected to a hydrant actuation nut of the hydrant, wherein the hydrant is opened and closed by rotating the hydrant actuation nut.

Arranging the hydrant open-close sensor and the wireless hydrant open-close communication means in or on an adapter cap connected to the hydrant actuation nut provides simple installation of the hydrant open-close sensor and the wireless hydrant open-close communication means and easy access to the hydrant open-close sensor and the wireless hydrant open-close communication means in case of maintenance or repair.

In an aspect of the disclosure, a reference part is connected to the hydrant and wherein the at least one hydrant open-close sensor is connected to the adaptor cap.

Connecting the adaptor cap comprising the open-close sensor to the hydrant actuation nut and connecting the reference part to the hydrant housing is advantageous in that precise and reliable information regarding rotation of the adaptor cap in relation to the fixed hydrant housing hereby can be achieved. Furthermore, a dedicated reference part also enables that direction of rotation more easily can be detected.

It should be noted that in this context the term "reference part" includes anything that can be detected by a sensor. I.e. the term includes any kind of magnet, light emitting or absorbing device, a sound emitter, variations in geometry, variations in color, holes in a surface or other.

In an aspect of the disclosure, the branch water pressure sensor is arranged in a flange joint of the branch pipe.

Mounting the branch water pressure sensor at a flange joint of the branch pipe is advantageous in that the joint provide easy access to the water without compromising the structural integrity of the components of the branch pipe.

In an aspect of the disclosure, the sensor system further comprises a temperature sensor.

Providing the sensor system with a temperature sensor is advantageous in that it enables that the temperature of the system, the water, the surroundings or other can be monitored to e.g. compensate the estimated pressure or the detected status of the stop valve or hydrant. Furthermore, hydrants are often located along existing infrastructure e.g. in or along the roads in a city. And the system is often located in a surface box in or at these roads. Thus, it is advantageous to also make the sensor system comprises a temperature sensor in that the distributed hydrants etc. hereby also could be used to monitor road temperatures and/or provide more precise local temperatures.

FIGURES

Figure 2:
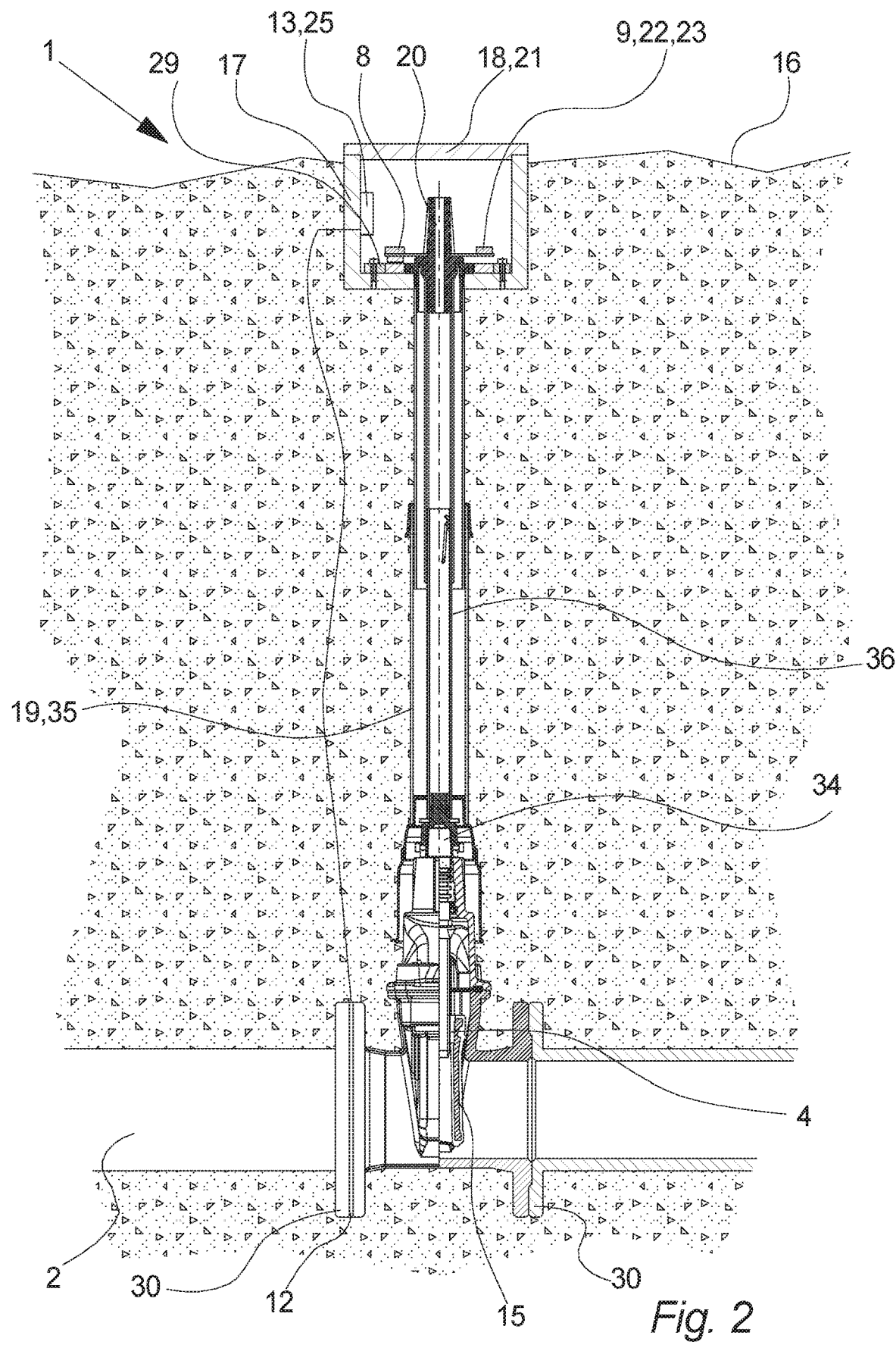
Figure 3:
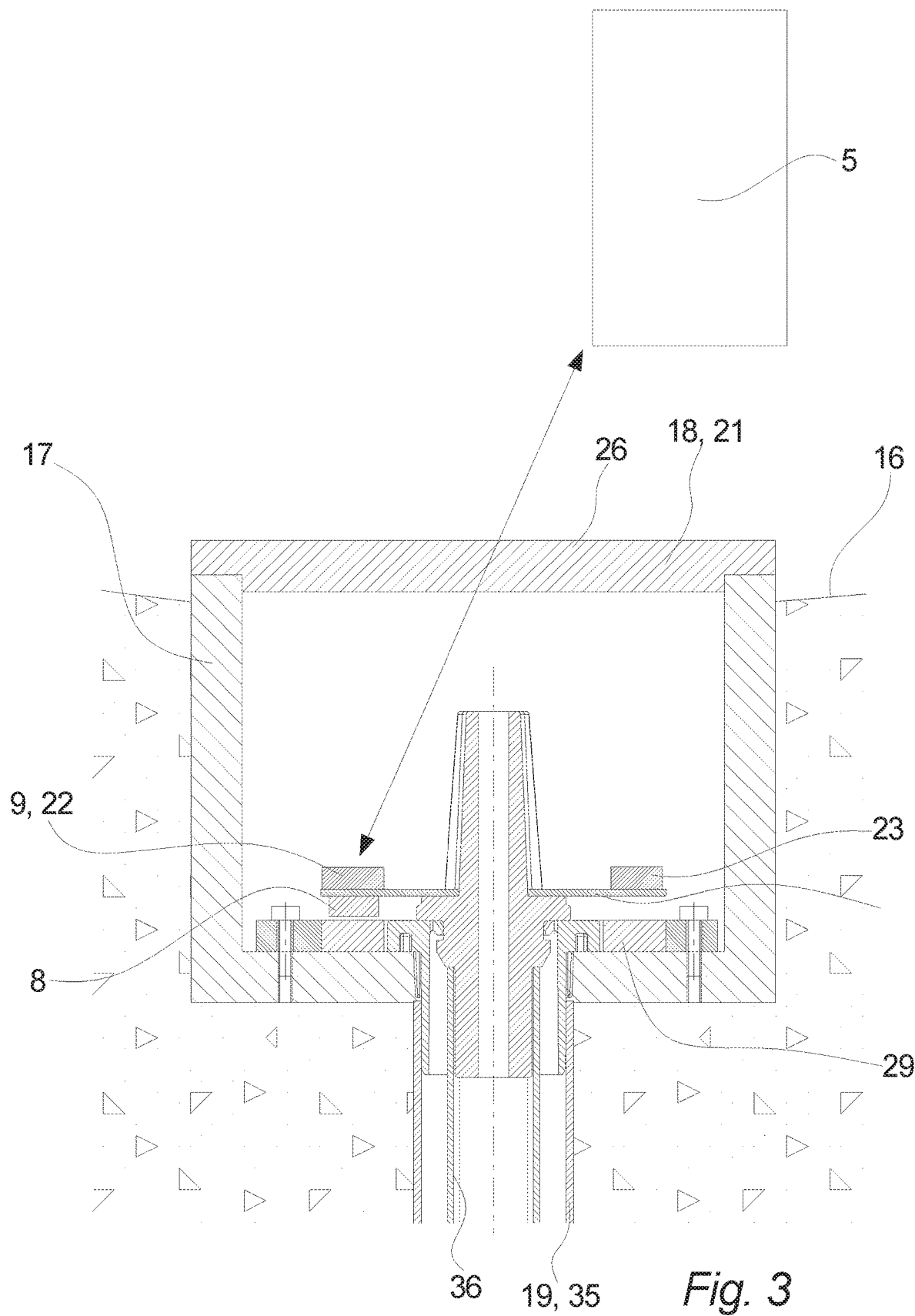

An embodiment of the disclosure will be described, by way of non-limiting example, in the following with reference to the figures in which:

FIG. 1 illustrates a hydrant water pressure estimation system, as seen from the side, FIG. 2 illustrates a cross section through the middle of an extension device, a surface box and stop valve, as seen from the side, and FIG. 3 illustrates a cross section through the middle of a stop valve open-close sensor mounted in a surface box, as seen from the side.

DETAILED DESCRIPTION

FIG. 1 illustrates a hydrant water pressure estimation system 7, as seen from the side.

In this embodiment a fire hydrant 1 is designed such that it may be operated from above the ground surface 16 so that firefighters may easily obtain access to the water supply by attaching a fire hose to the water outlet 32.

As seen on the figure, the fire hydrant 2 is a relatively standard hydrant comprising a hydrant housing in which an actuation rod 33 extends down and towards a blocking element 31, so that the flow of water from the branch pipe 2 and up to the hydrant 2 may be regulated depending on the position of the blocking element 31. In this embodiment a hydrant actuation nut 28 is extending downwards and is engaging the actuation rod 33 through a threaded connection so that when the hydrant actuation nut 28 is rotated, the actuation rod 33 is pushed downwards or pulled upwards depending on the direction of rotation. I.e. in this embodiment, the fire hydrant 1 is a dry barrel hydrant in that the area between the blocking element 31 and the water outlet 32 is normally not filled with water (and therefore dry). However, in another embodiment, the fire hydrant 1 could be a wet barrel hydrant where the hydrant 1 is filled with water up to the water outlets 32 and each water outlet 32 can be operated individually.

When the hydrant actuation nut 28 is rotated the actuation rod 33 travels up and down so that the blocking element 31 may travel up and down and thereby the flow of water into the upper part of the hydrant 1 may be adjusted.

In this embodiment the hydrant actuation nut 28 at the top of the hydrant 1 is provided with an adapter cap 27 which is also called a weather shield. The adaptor cap 27 is provided with connection means so that it may engage the hydrant actuation nut 3. The connection means is formed so that it corresponds to the shape of the hydrant actuation nut 28 so that it may directly engage the hydrant actuation nut 28 without any modifications, adapters or other.

In order to measure various operational parameters, the adapter cap 27 of this embodiment comprises an accelerometer for measuring any movement and a temperature sensor for measuring the temperature. In this embodiment the adaptor cap 27 also comprises a hydrant open-close sensor 10 for detecting the open-close status of the hydrant 1 and wireless hydrant open-close status communication means 11 for communicating the hydrant open-close status to an external data system 5. The measured data may be communicated to the outside of the adapter cap 27 via a build-in antenna or it may be stored in an integrated memory. The memory could store certain amount of information so that the measured and stored data—such as the hydrant open-close status—is sent out once every e.g. minute, hour, day, week or other. However, in another embodiment the hydrant open-close status and/or other measured data could be processed by integrated processing means before data was transmitted via the hydrant open-close status communication means 11 e.g. to send statistics, to only send data if the hydrant open-close status is above a predefined threshold, outside a predefined range, if it changes or other.

In this embodiment the adapter cap 27 further comprises a hydrant power unit 24 for providing the hydrant open-close sensor 10, the wireless hydrant open-close status communication means 11 and e.g. various electronics with the necessary power. The adapter cap 1 may also comprise other type of electronics such as a microphone, hygrometer, seismometer, camera or any other type of electronic device or instrument which may measure, capture or meter parameters such as humidity, vibrations, light, chemicals, gases or other.

In another embodiment the hydrant open-close sensor 10 and/or the wireless hydrant open-close status communication means 11 may be located elsewhere on the hydrant 1 such as directly on the hydrant actuation nut 28, in relation to the actuation rod 33, in or on the hydrant housing or elsewhere on the hydrant 1 or any combination thereof. And/or the wireless hydrant open-close status communication means 11 could be located separate for the hydrant open-close sensor 10 at location away for the hydrant 1 e.g. if the wireless hydrant open-close status communication means 11 was integrated with other parts of the hydrant water pressure estimation system 7 such as with other wireless communication means.

In this embodiment the bottom part of the hydrant 1 comprises the blocking element 31 which may be drawn up against a blocking element seat so that the water from the water supply may not flow up through the hydrant 1. And if the blocking element 31 pushed downwards away from the blocking element seat, water is allowed to flow through and up through the upper part of the hydrant 1.

In this embodiment the hydrant 1 is located at the end of a branch pipe 2 being branched of a main pipe 3. A water distributing system typically comprises a number of main pipes 3 extending from a water plant (not shown). In a city the main pipes 3 typically run under and along the roads of the city and at strategically chosen points branch pipes 2 are branched of the main pipe 3 to supply a hydrant 1 with water e.g. in case of a nearby fire.

To ensure that the water supply to the hydrant 1 can be shut off e.g. in case of maintenance or repair, the branch pipe 2 is provided with a stop valve 4 arranged somewhere between the main pipe 3 and the hydrant 1. In this embodiment the stop valve 4 is a gate valve but in another embodiment the stop valve could be a butterfly valve, a plug valve, a globe valve or other.

In this embodiment the hydrant water pressure estimation system 7 also comprises a stop valve open-close sensor 8 arranged to detect a valve open-close status of a stop valve 4 arranged in the branch pipe 2 and wireless valve open-close status communication means 9 arranged to communicate the valve open-close status wirelessly to the external data system 5. In this embodiment the stop valve open-close sensor 8 and the wireless valve open-close status communication means 9 are arranged in a surface box 17 above the stop valve 4 but in another embodiment the surface box 17 could be so large that it formed a manhole where the stop valve 4 was arranged at the bottom of this large surface box 17 so that the stop valve open-close sensor 8 could be arranged directly on or in the stop valve 4.

In this embodiment the hydrant water pressure estimation system 7 also comprises a branch water pressure sensor 12 arranged to detect the water pressure in the branch pipe 2 and wireless branch water pressure communication means 13 arranged to communicate the branch water pressure wirelessly to the external data system 5. In this embodiment the branch water pressure sensor 12 is arranged in the flange joint 30 between the stop valve 4 and the branch pipe part connecting the stop valve 4 with the hydrant 1. However, in another embodiment the branch water pressure sensor 12 could be located in the flange joint 30 on the other side of the stop valve 4, in the flange joint at the main pipe 3 or at the hydrant 1 and/or the branch water pressure sensor 12 could be located elsewhere on or in the branch pipe 2, on or in the stop valve 4, or on or in the hydrant 1. In this embodiment hydrant water pressure estimation system 7 only comprises a single branch water pressure sensor 12 but in another embodiment the hydrant water pressure estimation system 7 could comprise two, three or even more branch water pressure sensors 12. In this embodiment the branch water pressure sensor 12 is a transducer arranged to generate an electrical signal in proportion to the water pressure it measures. However, in another embodiment the branch water pressure sensor 12 could be electromagnetically, piezoelectrically, capacitively based or the branch water pressure sensor 12 could also or instead be of another type.

In this embodiment the wireless branch water pressure communication means 13 are formed integrally with the wireless valve open-close status communication means 9 but, in another embodiment, the wireless branch water pressure communication means 13 and the wireless valve open-close status communication means 9 would be formed separate e.g. at two different locations in the hydrant water pressure estimation system 7. I.e. in another embodiment the wireless branch water pressure communication means 13 could be located at the branch water pressure sensor 12 or at the wireless valve open-close status communication means 9.

In this embodiment the branch water pressure sensor 12 and the wireless branch water pressure communication means 13 are provided with a branch power unit 25 arranged at two different locations. I.e. in this embodiment a part of the branch power unit 25 is located at the branch water pressure sensor 12 and another part of the branch power unit 25 is formed integrally with the valve power unit 23 arranged in the surface box 17 to provide electrical power to the stop valve open-close sensor 8 and wireless valve open-close status communication means 9. However, in another embodiment the branch power unit 25 could be a single unit and/or the valve power unit 23 and/or the hydrant power unit 24 could be formed as different unit parts arranged at different location e.g. to reduce wiring.

In another embodiment the valve power unit 23, the hydrant power unit 24 and/or the branch power unit 25 could further comprise one or more solar cells 26 and/or in another embodiment the valve power unit 23, the hydrant power unit 24 and/or the branch power unit 25 could also or instead be provided with a fuel cell, a generator or other means for providing electrical power to the electrical power consuming components of the hydrant water pressure estimation system 7. In another embodiment the valve power unit 23, the hydrant power unit 24 and/or the branch power unit 25 could also or instead comprise an external electrical power supply such as the electrical grid.

In this embodiment the hydrant water pressure estimation system 7 also comprises data processing means 14 arranged to receive the valve open-close status, the hydrant open-close status and the branch water pressure by means of the external data system 5 and thus estimate the hydrant water pressure at the hydrant 1 based on the hydrant open-close status, the valve open-close status and the valve water pressure. In this embodiment the data processing means 14 comprises a computer and appertaining software located at the water plant but in another embodiment the external data system 5 could comprise a cloud solution enabling that the estimated hydrant water pressure and/or the valve open-close status, the hydrant open-close status and/or the branch water pressure could be accessed online e.g. through a dedicated software program.

In this embodiment the hydrant water pressure at the hydrant is remotely estimated by detecting the valve open-close status of the stop valve and transmitting the valve open-close status wirelessly to the external data system 5, detecting the hydrant open-close status of the hydrant 1 and transmitting the hydrant open-close status wirelessly to the external data system 5, detecting the branch water pressure in the branch pipe 2 and transmitting the branch water pressure wirelessly to the external data system 5, and estimating the hydrant water pressure at the hydrant 1 based on the valve open-close status, the hydrant open-close status and the branch water pressure.

In this embodiment the wireless hydrant open-close status communication means 11, the wireless valve open-close status communication means 9 and the wireless branch water pressure communication means 13 are arranged for communicating the statuses and the pressure to the external data system 5 once every week to ensure that the system is alive and working. However, in this embodiment the system also sends the statuses or the pressure if one of these changes or falls outside a predefined range e.g. to detect faults, use of the hydrant or tampering. However, in another embodiment the wireless hydrant open-close status communication means 11, the wireless valve open-close status communication means 9 and/or the wireless branch water pressure communication means 13 could also be arranged to receive a signal from the external data system 5 which would trigger that the wireless hydrant open-close status communication means 11, the wireless valve open-close status communication means 9 and the wireless branch water pressure communication means 13 would communicating the statuses and the pressure to the external data system 5. And in another embodiment the hydrant water pressure estimation system 7 could also or instead comprise local memories or a memory and local processing means for collecting, storing and/or processing the hydrant open-close status, the valve open-close status and/or the valve water pressure locally at the branch pipe so that e.g. statistical, accumulated, pre-processed or other information regarding the hydrant open-close status, the valve open-close status and the valve water pressure of the system could be transmitted to the external data system 5.

In this embodiment wireless hydrant open-close status communication means 11, the wireless valve open-close status communication means 9 and the wireless branch water pressure communication means 13 are arranged for communicating the statuses and the pressure to the external data system 5 by means of the long range wireless communication protocol LoRa, but in another embodiment one or more of the communication means 9, 11, 13 could also or instead be arranged to communicate via WIFI, GPRS, NB-IoT, 3G, 4G, 5G, Sigfox or another communication protocol.

In another embodiment of the disclosure one or more of the wireless hydrant open-close status communication means 11, the wireless valve open-close status communication means 9 and the wireless branch water pressure communication means 13 could be arranged as a single unit and the statuses and/or pressure could be communicated between the wireless hydrant open-close status communication means 11, the wireless valve open-close status communication means 9, the wireless branch water pressure communication means 13 and/or the stop valve open-close sensor 8, the hydrant open-close sensor 10 and/or the branch water pressure sensor 12 locally by means of a short-range communication protocol such as Bluetooth, WIFI, Near-field communication (NFC), Zigbee or other and then transmitted to the external data system 5 by means of one or more of integrated versions of the wireless hydrant open-close status communication means 11, the wireless valve open-close status communication means 9 and the wireless branch water pressure communication means 13.

In another embodiment the wireless hydrant open-close status communication means 11, the wireless valve open-close status communication means 9 and the wireless branch water pressure communication means 13 could also or instead be arranged to transmit the detected statuses and/or the pressure to the external data system 5 by means of a repeater, by means of a concentrator, by means of communication between different branch pipe systems or different hydrant water pressure estimation systems 7.

FIG. 2 illustrates a cross section through the middle of an extension device 19, a surface box 17 and stop valve 4, as seen from the side.

In this embodiment the operating device 34 of a buried stop valve 4 comprises an extension device 19 formed by an extension device housing 35 substantially surrounding an inner extension rod 36. At ground surface 16 the extension rod 36 of the extension device 19 extends up into a surface box 17 to enable that the operating device 34—comprising the extension device 19—may easily be accessed and manipulated at ground level 16. However, in another embodiment the extension device 19 could be formed in numerous other ways such as a simple extension rod, it could also or instead comprise gears to displace the rotational axis or to gear the rotation of the operating device 34, it could also or instead comprise brakes or couplings, it could also or instead comprise joints such as universal joint or other.

In this embodiment the surface box 17 comprises a surface box housing having a bottom opening at the bottom through which the extension device 19 extends up into the surface box 17. In this embodiment the surface box 17 is cylindrical but in another embodiment, it could be square, triangular or have a different shape.

In this embodiment the surface box 17 is placed in the ground so that the top of the surface box 17 is substantially level with the ground surface 16. However, in another embodiment the surface box 17 could be arranged deeper in the ground or it could be placed more or less on or over ground level.

In this embodiment the surface box 17 also has an upper opening 18 arranged at the top of the surface box 17 opposite the bottom opening. The upper opening 18 enables access to the inside of the surface box 17.

In this embodiment the surface box 17 further comprises a lid 21 arranged to cover the upper opening 18 and thereby protect the inside of the surface box 17 from unwanted access, water, foreign elements and other. In this embodiment the lid 21 is made from plastic but in another embodiment the lid 21 could be made from another polymer material, it could be made from a composite material, from a ceramic material or other.

In this embodiment a stop valve open-close sensor 8 is arranged to detect a valve open-close status of the stop valve 4 inside the surface box 17. However, in another embodiment the stop valve open-close sensor 8 could be located directly on the stop valve 4 or elsewhere in connection with the operating device 34 e.g. if the stop valve 4 did not comprise an extension device 19 or it comprises another type of extension device 19.

FIG. 3 illustrates a cross section through the middle of a stop valve open-close sensor 8 mounted in a surface box 17, as seen from the side.

In this embodiment the stop valve open-close sensor 8 comprises a reference part 29 being held in a fixed position in the surface box 17. However, in another embodiment the reference part 29 could instead be connected to the extension device 19 or the operating device 34 of the stop valve 4 ensuring that the reference part 29 would rotate with the operating device 34 when it is rotated.

In this embodiment the reference part 27 comprises two permanent magnets parts arranged so that they have opposite polarity in the direction of the rotational axis of the operating device 2.

In this embodiment the stop valve open-close sensor 8 is arranged to rotate along with the operating device 3 of the stop valve 4 when it is rotated. In this embodiment the sensor 8 is actually comprises two sensors 8 spaced 90 degrees apart so that not only the number of rotations can be detected but also the direction of rotation of the operating device 3 of the stop valve 4 can be detected by detecting the in which sequence the sensors 8 move to or from a specific polarity of the magnets in the reference part 29. In an embodiment the hydrant open-close sensor 10 would detect the hydrant open-close status by means of a similar arrangement. However, in another embodiment the stop valve open-close sensor 8 and/or the hydrant open-close sensor 10 could comprise an encoder, an ultrasound sensor, a proximity sensor, a photo optic sensor or other arranged to detect the open-close statuses e.g. by detecting displacement of a part of the hydrant or valve being displaced when the hydrant or valve changes open-close status.

In this embodiment the hydrant water pressure estimation system 7 also comprises a valve power unit 23 in the form of a battery for supplying electrical power to the valve open-close sensor 8 and the wireless valve open-close status communication means 9 and in this embodiment the valve power unit 23 and the wireless valve open-close status communication means 9 are located just below the lid 21 of the surface box 17 to ensure easy access and ensure sufficient signal transmission through the lid 21. However, in another embodiment the wireless branch water pressure communication means 13 and/or the wireless valve open-close status communication means 9 could comprise an antenna integrated in the lid 21, placed on the lid 21 or placed at another location that would ensure efficient signal transmission to the external data system 5.

In an embodiment one or more of the electronic parts 8, 9, 10, 11, 12, 13 of the hydrant water pressure estimation system 7 arranged locally at the branch pipe 2 could be arranged to receive an activation signal which will active the locally installed electronic components. During storage, handling, mounting etc. internal power from the power units 23, 24, 25 to at least some of the sensors 8, 10, 12, the wireless communication means 9, 11, 13 and other local electronic parts, such as memory, processors and other could be cut off to save power. In response to receiving an activation signal full power to all parts of the hydrant water pressure estimation system 7 would be enabled and the hydrant water pressure estimation system 7 will be in full operating mode.

In another embodiment the hydrant water pressure estimation system 7 could further comprise a temperature sensor arranged in the lid 21 of the surface box 17 to detect and communicate the ground surface temperature. In another embodiment the hydrant water pressure estimation system 7 could also or instead comprise other sensors like rain sensors, moist sensors, smog sensors, tamper sensors, light sensors or other kinds of sensors enabling that additional information could advantageously be provided by the hydrant water pressure estimation system 7 given that the hydrants 1 are distributed advantageously in relation to e.g. get a good and well distributed data overview.

The disclosure has been exemplified above with reference to specific examples of hydrants 1, stop valves 4, external data systems 5 and other. However, it should be understood that the disclosure is not limited to the particular examples described above but may be designed and altered in a multitude of varieties within the scope of the disclosure as specified in the claims.

The invention claimed is:

1. A method for remote estimation of hydrant water pressure at a hydrant located at an end of a branch pipe being branched of a main pipe, said method comprising the steps of:
   - detecting a valve open-close status of a stop valve arranged in said branch pipe and transmitting said valve open-close status wirelessly to an external data system,
   - detecting a hydrant open-close status of said hydrant and transmitting said hydrant open-close status wirelessly to said external data system,
   - detecting a branch water pressure of water in said branch pipe and transmitting said branch water pressure wirelessly to said external data system, and
   - estimating said hydrant water pressure at said hydrant based on said valve open-close status, said hydrant open-close status and said branch water pressure.

2. A method according to claim 1, wherein said branch water pressure is detected between said stop valve and said hydrant.

3. A method according to claim 2, wherein said hydrant open-close status is transmitted wirelessly from said hydrant to said external data system via the same wireless communication means transmitting said valve open-close status and/or said branch water pressure to said external data system.

4. A method according to claim 1, wherein said branch water pressure is detected between said stop valve and said main pipe.

5. A method according to claim 1, wherein said valve open-close status is transmitted wirelessly to said external data system if said valve open-close status changes, said hydrant open-close status is transmitted wirelessly to said external data system if said hydrant open-close status changes and/or said branch water pressure is transmitted wirelessly to said external data system if said branch water pressure changes.

6. A method according to claim 1, wherein said valve open-close status is transmitted wirelessly to said external data system if said valve open-close status is outside a predefined range, said hydrant open-close status is transmitted wirelessly to said external data system if said hydrant open-close status is outside a predefined range and/or said branch water pressure is transmitted wirelessly to said external data system if said branch water pressure is outside a predefined range.

7. A method according to claim 1, wherein said valve open-close status is detected and communicated to said external data system in response to a request send from said external data system to wireless valve open-close status communication means arranged to communicate said valve open-close status wirelessly to said external data system.

8. A method according to claim 1, wherein said branch water pressure is detected and communicated to said external data system in response to a request send from said external data system to wireless branch water pressure communication means arranged to communicate said branch water pressure wirelessly to said external data system.

9. A method according to claim 1, wherein said hydrant open-close status is detected and communicated to said external data system in response to a request send from said external data system to wireless hydrant open-close status communication means arranged to communicate said hydrant open-close status wirelessly to said external data system.

10. A method according to claim 1, wherein said hydrant water pressure at said hydrant is estimated based on said valve open-close status, said hydrant open-close status and said branch water pressure at said external data system.

11. A method according to claim 1, wherein said stop valve is arranged upstream in relation to said hydrant.

12. A hydrant water pressure estimation system for remote estimation of the hydrant water pressure at a hydrant located at an end of a branch pipe being branched of a main pipe, said system comprising:
    a stop valve open-close sensor arranged to detect a valve open-close status of a stop valve arranged in said branch pipe,
    wireless valve open-close status communication means arranged to communicate said valve open-close status wirelessly to an external data system,
    a hydrant open-close sensor arranged to detect a hydrant open-close status of said hydrant,
    wireless hydrant open-close status communication means arranged to communicate said hydrant open-close status wirelessly to said external data system,
    a branch water pressure sensor arranged to detect the water pressure in said branch pipe,
    wireless branch water pressure communication means arranged to communicate said branch water pressure wirelessly to said external data system, and
    data processing means arranged to receive said valve open-close status, said hydrant open-close status and said branch water pressure by means of said external data system and wherein said data processing means is arranged to estimate the hydrant water pressure at said hydrant based on said hydrant open-close status, said valve open-close status and said valve water pressure.

13. A hydrant water pressure estimation system according to claim 12, wherein said branch water pressure sensor is arranged between a gate of said stop valve and said hydrant.

14. A hydrant water pressure estimation system according to claim 12, wherein said branch water pressure sensor is arranged between a gate of said stop valve and said main pipe.

15. A hydrant water pressure estimation system according to claim 12, wherein said wireless valve open-close status communication means and said wireless branch water pressure communication means are arranged as the same communication means.

16. A hydrant water pressure estimation system according to claim 12, wherein said wireless valve open-close communication means, said wireless hydrant open-close status communication means and said wireless branch water pressure communication means are arranged as the same communication means.

17. A hydrant water pressure estimation system according to any of claims 12-16, wherein said branch pipe is buried in the ground below ground surface.

18. A hydrant water pressure estimation system according to claim 12, wherein said stop valve is buried in the ground below ground surface and wherein said stop valve is arranged to be operated in a surface box comprising an upper opening at said ground surface.

19. A hydrant water pressure estimation system according to claim 18, wherein an extension device is connected to a operating device of said stop valve and wherein said extension device extends up into said surface box.

20. A hydrant water pressure estimation system according to claim 18, wherein said stop valve is at least partly arranged in said surface box.

21. A hydrant water pressure estimation system according to claim 18, wherein said wireless valve open-close status communication means is arranged in said surface box.

22. A hydrant water pressure estimation system according to claim 18, wherein said upper opening is provided with a lid.

23. A hydrant water pressure estimation system according to claim 22, wherein said lid is made of plastic.

24. A hydrant water pressure estimation system according to claim 22, wherein at least an antenna of said wireless valve open-close status communication means is arranged in, at or on said lid.

25. A hydrant water pressure estimation system according to claim 12, wherein said hydrant water pressure estimation system further comprises a valve power unit for supplying electrical power to said stop valve open-close sensor and said wireless valve open-close status communication means, a hydrant power unit for supplying electrical power to said hydrant open-close sensor and said wireless hydrant open-close status communication means and/or a branch power unit for supplying electrical power to said branch water pressure sensor and said wireless branch water pressure communication means.

26. A hydrant water pressure estimation system according to claim 25, wherein said valve power unit and said branch power unit are formed as a single power unit.

27. A hydrant water pressure estimation system according to claim 18, wherein said valve power unit and/or said branch power unit is arranged in said surface box or on, at or in said lid.

28. A hydrant water pressure estimation system according to claim 25, wherein said valve power unit, said hydrant power unit and/or said branch power unit comprises one or more solar power cells.

29. A hydrant water pressure estimation system according to claim 12, wherein said stop valve is a gate valve.

30. A hydrant water pressure estimation system according to claim 12, wherein said hydrant open-close sensor and said wireless hydrant open-close status communication means is arranged in or on an adapter cap, wherein said adapter cap is connected to an hydrant actuation nut of said hydrant, wherein said hydrant is opened and closed by rotating said hydrant actuation nut.

31. A hydrant water pressure estimation system according to claim 30, wherein a reference part is connected to said hydrant and wherein said at least one hydrant open-close sensor is connected to said adaptor cap.

32. A hydrant water pressure estimation system according to claim 12, wherein said branch water pressure sensor is arranged in a flange joint of said branch pipe.

* * * * *